May 19, 1936.  B. B. WHITTLE  2,041,669
VALVE
Filed June 26, 1933  2 Sheets-Sheet 1

Benjamin B. Whittle INVENTOR.
BY Loyal J. Miller
ATTORNEYS.

May 19, 1936.  B. B. WHITTLE  2,041,669
VALVE
Filed June 26, 1933  2 Sheets-Sheet 2

Patented May 19, 1936

2,041,669

UNITED STATES PATENT OFFICE 2,041,669

VALVE

Benjamin B. Whittle, Oklahoma City, Okla.;
Lessie F. Whittle executrix of said Benjamin
B. Whittle, deceased Application June 26, 1933, Serial No. 677,595

2 Claims. (Cl. 251—93)

My invention relates to valves for controlling the flow of fluids, and more particularly to valves for use on high pressure lines.

It is the prime object of my invention to provide a valve which may be kept properly lubricated and in which the lubricant may be introduced therein under a pressure greater or approximately as great as the pressure to be accommodated by the flow line upon which it is to be used, the pressure of the lubricant acting as a counterbalance to the flow line pressure thus preventing the valve core from sticking in its housing and making it possible for the core to be more easily moved.

Other objects of the invention are to provide a device of this class which is new, novel, practical and of utility; the lubricant in which will be positively retained during the use of the valve; the pressure of the lubricant in which will act to prevent wear upon the frictional surfaces thereof; which will be simple in construction; which will be comparatively cheap to manufacture; which will be durable; and, which will be efficient in accomplishing all the purposes for which it is intended.

With these and other objects in view as will more fully appear, my invention consists in the construction, novel features, and combination of parts hereinafter more fully described, pointed out in the claims hereto appended, and illustrated in the accompanying two-sheet drawing, of which, Fig. 1 is an elevational sectional view through the center of the valve;

Like characters of reference designate like parts in all the figures.

Figure 1:
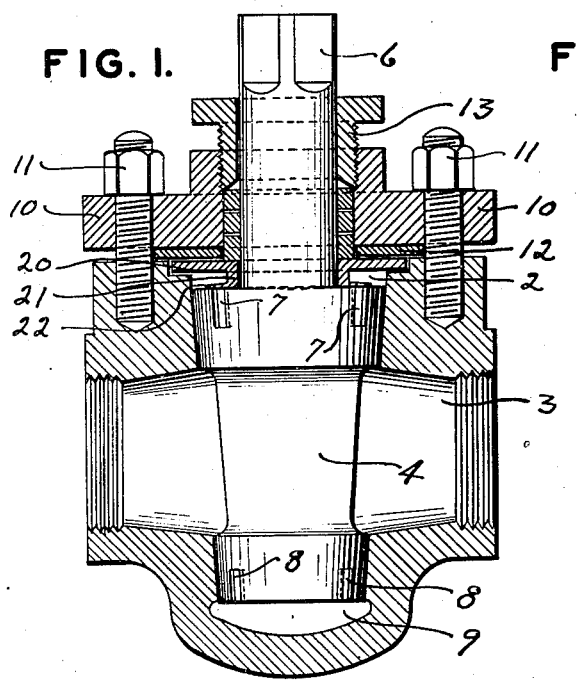
Figure 2:
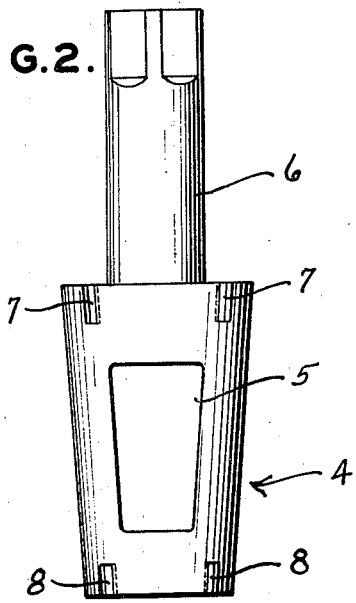
Fig. 2 is an elevational view of the valve core.

It is understood that various changes in the form, proportion, size, shape, weight and other details of construction, within the scope of my invention may be resorted to without departing from the spirit or broad principle of my invention and without sacrificing any of the advantages thereof; and it is also understood that the drawings are to be interpreted as being illustrative and not restrictive.

One practical embodiment of the invention as illustrated in the drawings follows:

The reference numeral 1 indicates as a whole a valve housing having a slightly tapered vertical bore 2 which intercepts a horizontal flow hole 3 which is adapted at both ends to connect a flow line, not shown. A valve core 4 having a transverse flow hole 5 and an upstanding shaft or stem 6 is rotatably mounted in the bore 2 and is slightly tapered so that a tight working fit is had in the housing. The flow hole 5 is so shaped that when the core is in a proper radial position it forms a smooth continuation of the flow hole 3. It will be noted that the bore 2 extends below the bottom of the core 4 and forms a pocket 9.

The upper periphery of the core 4 is provided with four superficial grooves or notches 7 which are spaced radially at ninety degrees from each other. The lower periphery of the core is likewise provided with four similar notches or grooves 8. The office of the grooves 7 and 8 will be more fully described hereinbelow.

The top of the housing is closed by a removable plate or cover 10 which is held in place by any usual means such as bolts 11. A gasket 12 or any desired sealing means is provided between the housing and the cover, and a usual packing gland 13 is provided around the stem 6.

A particular feature of my valve is a metal sealing ring which is disposed around the stem 6 upon the core 4. This ring consists substantially of a comparatively heavy annular flange 20 having an integral depending tubular portion 21, the lower end of which has a second integral outstanding flange 22 which is considerably thinner than the flange 20. The flange 20 is countersunk into the upper surface of the housing beneath the gasket 12. The office of the sealing ring will be more fully described hereinbelow.

Figure 3:
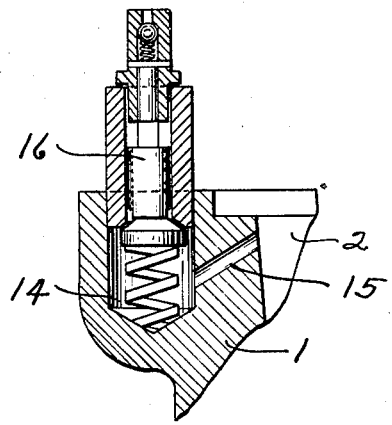
Fig. 3 is an elevational section through a portion of the valve housing showing the apparatus through which the lubricant is introduced into the valve.
Figure 4:
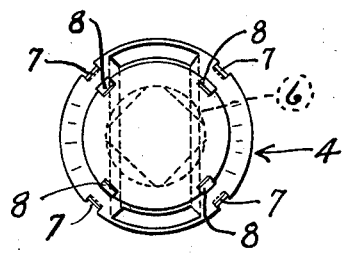
Fig. 4 is a bottom view of the valve core.

A portion of the housing is provided with a bored cavity 14 (Figs. 3 and 6) which has a passage 15 communicating with the upper portion of bore 2 thereof. The cavity houses a check valve 16 of any desired type which will permit the introduction but prevent the escape of a lubricant.

Figure 5:
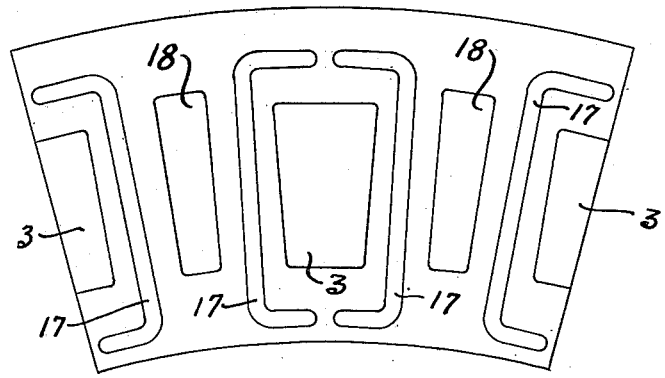
Fig. 5 is a development of the inner surface of the valve housing.
Figure 6:
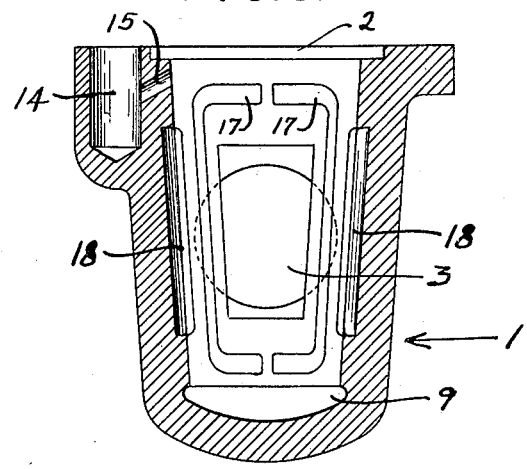
Fig. 6 is a vertical sectional view through the housing, taken at an angle ninety degrees from the position in which Fig. 1 was taken.

As may best be seen in Figs. 5 and 6, the wall of the bore 2 is provided with four superficial grooves 17 and with two substantially rectangular cavities 18. It will be noted that the grooves are placed in sets of two and that one groove of each set occurs at each side of each of the flow hole openings 3, and that the ends of the grooves are turned and extend toward the similar end of the other groove in each set. The grooves 17 are each of a sufficient length to provide communication between one of the notches 7 and one of the notches 8 which are carried by the core 4, when the core is within the housing.

In operation the valve will be installed upon a flow line in the usual manner. A lubricant will then be introduced under pressure through the check valve 16, whence it will flow through the passage 15 into the space between the flanges 20 and 22 of the sealing ring. The lubricant will further flow through notch or notches 7, groove or grooves 17, notch or notches 8 and into the cavity 9 beneath the valve core. If the valve core 4 is rotated to its closed position, all of the notches 7 and 8 will be brought into registration with the respective grooves 17 and consequently all of the notches 7 and 8, all of the grooves 17, the cavity 9 and the upper portion of the bore 2 around the sealing ring may be filled with the lubricant.

The pressure of the lubricant will be brought up to approximately the same pressure as the pressure of the fluid to be conveyed in the flow line. This pressure being equal both above and below the core, and the pressure of the lubricant being approximately the same as the pressure in the flow line, friction is reduced between the core and the housing.

The notches 7 and 8 and the grooves 17 are so arranged that when the valve core is rotated from an open to a closed position, the notches pass out of registration with the grooves 17, thus preventing the fluid in the flow line from entering the upper portion of the bore 2 and the cavity 9, and consequently the lubricant is prevented from being washed out by the flowing fluid. During the opening and closing of the core 4, at all times in which pressure from the flow-hole is exerted upon one of the grooves 17, their closed ends will prevent circulation through the grooves from one side of the core to the other, and consequently the lubricant in the grooves is prevented from being washed out into the flow-line. The horizontal portions of the grooves 17 are so spaced with relation to the flow-hole 3, and from each other, and the short grooves 7 and 8 are so spaced upon the core 4, that regardless of the direction in which the core is rotated in opening and closing the flow-hole, the forward ones of the grooves 7 and 8 pass out of registration with the grooves 17 during the time that the flow-hole 5 is in communication with both the flow-hole 3 and the grooves 17. At the same time, the trailing ones of the grooves 7 and 8 maintain communication between the lubricant compartments above and below the core and with the other or rear ones of the grooves 17. This insures at all times an equalization of the pressure above and below the core, and at the same time prevents the possibility of the lubricant being flushed out of the grooves or the lubricant containing compartments. It also insures proper lubrication of the core and the wall of the housing during rotation of the core. When the core is in its closed position, the grooves 17 are again in registration with the notches 7 and 8.

The cavities 18 are provided for the purpose of receiving any extraneous matter or refuse which might adhere to the surface of the core 4.

The flange 22 is so constructed that the pressure of the lubricant thereabove causes the flange to bend slightly downward to form a hermetic seal with the upper surface of the core.

Obviously, the invention is susceptible of embodiment in forms other than that which is illustrated in the accompanying drawings and described herein, and applicable, for uses and purposes other than as detailed, and I therefore consider as my own all such modifications and adaptations and other uses of the form of the device herein described as fairly fall within the scope of my invention.

Having thus described my invention, what is claimed and desired to be secured by Letters Patent, is:

1. In a lubricated valve comprising a body, a plug rotatably mounted in the body, a stem for actuating the plug, and a head portion secured to the body and over-lapping the upper end of the plug in such a manner as to form a lubricant chamber therebetween, a seal for preventing leakage of lubricant from the lubricant chamber comprising a ring-like metal member mounted on the upper end of the plug and surrounding the stem and having portions in engagement with the upper end of the plug and the head portion respectively.

2. In a lubricated valve comprising a body, a plug rotatably mounted in the body, a stem for actuating the plug, and a head portion secured to the body and over-lapping the upper end of the plug in such a manner as to form a lubricant chamber therebetween, a seal for preventing leakage of lubricant from the lubricant chamber comprising a resilient ring-like metal member mounted on the upper end of the plug and surrounding the stem and having portions in engagement with the upper end of the plug and the head portion respectively.

BENJAMIN B. WHITTLE.